(12) United States Patent
Sugiyama et al.

(10) Patent No.: US 8,872,984 B2
(45) Date of Patent: Oct. 28, 2014

(54) TUNER MODULE, AND MOBILE COMMUNICATION TERMINAL

(75) Inventors: Yoshikazu Sugiyama, Tokyo (JP); Masaaki Yamada, Tokyo (JP)

(73) Assignee: TKR Corporation Co., Ltd., Tokyo (JP)

( * ) Notice: Subject to any disclaimer, the term of this patent is extended or adjusted under 35 U.S.C. 154(b) by 0 days.

(21) Appl. No.: 14/116,350

(22) PCT Filed: Mar. 29, 2012

(86) PCT No.: PCT/JP2012/058332
§ 371 (c)(1),
(2), (4) Date: Dec. 18, 2013

(87) PCT Pub. No.: WO2012/153575
PCT Pub. Date: Nov. 15, 2012

(65) Prior Publication Data
US 2014/0184921 A1    Jul. 3, 2014

(30) Foreign Application Priority Data
May 10, 2011    (JP) ................................. 2011-105290

(51) Int. Cl.
*H04N 5/44* (2011.01)
*H04N 5/50* (2006.01)
*H04B 7/08* (2006.01)

(52) U.S. Cl.
CPC ...................................... *H04N 5/50* (2013.01)
USPC ......................................... 348/731; 348/725

(58) Field of Classification Search
USPC .............................. 348/725, 731, 14.01, 838; 343/725–730; 342/55; 725/62, 73; 375/267, 347, 340, 350, 344; 455/75, 455/77, 84, 569.2, 556.1, 556.2, 132, 133, 455/188.1, 188.2, 180.2, 272–275, 344, 455/351, 150.1, 141, 135
See application file for complete search history.

(56) References Cited

U.S. PATENT DOCUMENTS 6,445,357 B1 * 9/2002 Sinclair ......................... 343/820
2004/0102221 A1 * 5/2004 Shirosaka et al. .......... 455/562.1

(Continued)

FOREIGN PATENT DOCUMENTS

JP    1-157131 A    6/1989
JP    2007-74491 A    3/2007

(Continued)

OTHER PUBLICATIONS

3GPP TS 36.214 V10.1.0 (Mar. 2011).

(Continued)

*Primary Examiner* — Victor Kostak
(74) *Attorney, Agent, or Firm* — Antonelli, Terry, Stout & Kraus, LLP.

(57) ABSTRACT

Provided is an LTE-system mobile communication terminal in which a reduction in terminal size and a reduction in the number of components is desired when a terrestrial digital television broadcast is to be received. Two antennas from among terrestrial digital television broadcast receiving antennas are switched and controlled so as to also be used as transmitting/receiving antennas from LTE communication, and the reception diversity is switched to either a 2-system combination or 4-system combination in accordance with whether the television broadcast is in the VHF band or UHF band. As a result, the number of antennas for example can be reduced and the terminal costs and size can be reduced.

21 Claims, 7 Drawing Sheets

(56) References Cited

U.S. PATENT DOCUMENTS

| | | | |
|---|---|---|---|
| 2007/0103602 A1 | 5/2007 | Ikeda | |
| 2007/0280297 A1* | 12/2007 | Nakatani et al. | 370/487 |
| 2008/0301750 A1* | 12/2008 | Silfvast et al. | 725/131 |
| 2010/0022197 A1* | 1/2010 | Kato et al. | 455/75 |
| 2010/0167672 A1* | 7/2010 | Ahn et al. | 455/132 |
| 2010/0316155 A1* | 12/2010 | Reinhold | 375/267 |
| 2011/0018780 A1* | 1/2011 | Tassoudji et al. | 343/844 |
| 2011/0154429 A1* | 6/2011 | Stantchev | 725/149 |
| 2012/0092861 A1* | 4/2012 | Hsu et al. | 362/225 |

FOREIGN PATENT DOCUMENTS

| | | |
|---|---|---|
| JP | 2007-104588 A | 4/2007 |
| JP | 2010-206312 A | 9/2010 |

OTHER PUBLICATIONS

3GPP TS 36.213 V10.1.0 (Mar. 2011).
3GPP TS 36.212 V10.1.0 (Mar. 2011).
3GPP TS 36.211 V10.1.0 (Mar. 2011).
3GPP TS 36.101 V10.2.1 (Apr. 2011).

* cited by examiner

TUNER MODULE, AND MOBILE COMMUNICATION TERMINAL

TECHNICAL FIELD

The present invention relates to a digital television broadcast reception tuner such as a digital television broadcast reception tuner which is built in car navigation systems or cellular phones that can perform mobile reception of a domestic terrestrial digital television broadcast (ISDB-T system).

BACKGROUND ART

A reception diversity technique, as one wireless communication technique, is in practical application in GSM (registered trademark) cellular phones and IS-95 cellular phones as $2^{nd}$ generation cellular phones.

The reception diversity technique has been used in a case where mobile reception of a terrestrial digital broadcast is performed using a tuner built in the car navigation system. Patent Literature 1 discloses a conventional technique thereof.

In Patent Literature 1, two reception antennas are used. However, at present, a car navigation system with four antennas for reception diversity is in practical use.

As one spatial demultiplexing technique, MIMO (Multi Input Multi Output) technique is in practical use in 802.11n system transmitters/receivers for a wireless LAN (Local Area Network).

After this, the MIMO technique has been adopted in an LTE (Long Term Evolution) system as the $3.9^{th}$ generation cellular phone system.

The LTE system as the $3.9^{th}$ generation system is standardized as disclosed in Non-patent Literatures 1 to 5.

CITATION LIST

Patent Literature

Patent Literature 1: Japanese Laid-open Patent Publication No. 2010-206312

Non-Patent Literature

Non-patent Literature 1: 3GPP TS36.101
Non-patent Literature 2: 3GPP TS36.211
Non-patent Literature 3: 3GPP TS36.212
Non-patent Literature 4: 3GPP TS36.213
Non-patent Literature 5: 3GPP TS36.214

SUMMARY OF INVENTION

Technical Problem

A digital television broadcast receiver is considered which has a communication function of the LTE system cellular phones and performs mobile reception of terrestrial digital television broadcasts.

This type of receiver needs total six antennas, two antennas for LTE communication and four antennas for digital broadcast diversity reception.

It is an essential condition that the digital television broadcast receiver, which is capable of mobile reception, is very small for easy carrying. Thus, it is very difficult to mount six antennas inside the small casing.

No specific solution for this problem has been disclosed in the conventional techniques.

The present invention has been made in consideration of the above problem, and an object thereof is to provide a small-sized tuner module and a mobile communication terminal, which have a communication function of LTE system cellular phones and can perform mobile reception of a digital television broadcast.

Solution to Problem

In consideration of the above problem, according to the present invention, there is provided a tuner module which transmits/receives a signal for mobile communication through a transmitting/receiving antenna, and receives a signal of a digital television broadcast through a reception antenna or the reception antenna and the transmitting/receiving antenna, the module including:

a first high frequency switch which has a first contact point to which a transmitting/receiving RF signal for the mobile communication is supplied, a second contact point to which a reception RF signal of the digital television broadcast is supplied, and a common contact point to which one of the first contact point and the second contact point is selectively connected and which is connected to a first transmitting/receiving antenna;

a second high frequency switch which has a first contact point to which a transmitting/receiving RF signal for the mobile communication is supplied, a second contact point to which a reception RF signal of the digital television broadcast is supplied, and a common contact point to which one of the first contact point and the second contact point is selectively connected and which is connected to a second transmitting/receiving antenna; a first digital broadcast RF reception unit which receives a reception RF signal of the digital television broadcast supplied from the second contact point in the first high frequency switch, and converts the reception RF signal into a reception IF signal; a second digital broadcast RF reception unit which receives a reception RF signal of the digital television broadcast supplied from the second contact point in the second high frequency switch, and converts the reception RF signal into a reception IF signal; a third digital broadcast RF reception unit which receives a reception RF signal of the digital television broadcast supplied from a first reception antenna, and converts the reception RF signal into a reception IF signal; a fourth digital broadcast RF reception unit which receives a reception RF signal of the digital television broadcast supplied from a second reception antenna, and converts the reception RF signal into a reception IF signal; and a digital broadcast demodulating unit which receives the reception IF signals obtained by conversion by any of the first to fourth digital broadcast RF reception units, performs diversity combining on the signals, demodulates and externally outputs the signals.

According to the present invention, there is provided a mobile communication terminal which transmits/receives a signal for mobile communication through a transmitting/receiving antenna, and receives a signal of a digital television broadcast through a reception antenna or the reception antenna and a transmitting/receiving antenna, the terminal comprising:

a first transmitting/receiving antenna which transmits/receives a signal for the mobile communication, and receives a signal of the digital television broadcast; a second transmitting/receiving antenna which transmits/receives a signal for the mobile communication, and receives a signal of the digital television broadcast; a first reception antenna which receives a signal of the digital television broadcast; a second reception antenna which receives a signal of the digital television broadcast;

a first high frequency switch which has a first contact point to which a transmitting/receiving RF signal for the mobile communication is supplied, a second contact point to which a reception RF signal of the digital television broadcast is supplied, and a common contact point to which one of the first contact point and the second contact point is selectively connected and which is connected to the first transmitting/receiving antenna;

a second high frequency switch which has a first contact point to which a transmitting/receiving RF signal for the mobile communication is supplied, a second contact point to which a reception RF signal of the digital television broadcast is supplied, and a common contact point to which one of the first contact point and the second contact point is selectively connected and which is connected to the second transmitting/receiving antenna;

a mobile communication transmitting/receiving unit which generates the transmission RF signal for the mobile communication and supplies it to the first contact point in the first high frequency switch, processes a reception RF signal for the mobile communication supplied from the first contact point in the first high frequency switch, processes the reception RF signal for the mobile communication supplied from the first contact point in the second high frequency switch, and performs diversity combining on and demodulating the signal;

a first digital broadcast RF reception unit which receives a reception RF signal of the digital television broadcast supplied from the second contact point in the first high frequency switch, and converts the reception RF signal into a reception IF signal; a second digital broadcast RF reception unit which receives a reception RF signal of the digital television broadcast supplied from the second contact point in the second high frequency switch, and converts the reception RF signal into a reception IF signal; a third digital broadcast RF reception unit which receives a reception RF signal of the digital television broadcast from the first reception antenna, and converts the reception RF signal into a reception IF signal; a fourth digital broadcast RF reception unit which receives a reception RF signal of the digital television broadcast from the second reception antenna, and converts the reception RF signal into a reception IF signal; a digital broadcast demodulating unit which receives the reception IF signals obtained by conversion by any of the first to fourth digital broadcast RF reception units, and performs diversity combining on and demodulating the signals; and a control unit which controls an operation of the mobile communication terminal, the control unit controlling the first high frequency switch and the second high frequency switch to connect the common contact point in each of the first high frequency switch and the second high frequency switch to the first contact point when mobile communication is to be performed, and to connect the common contact point to the second contact point when the digital television broadcast is to be received.

Advantageous Effects of Invention

The present invention provides an effect of providing a small-sized and multi-functional tuner module and a mobile communication terminal, which has a communication function of the LTE system cellular phones and can perform mobile reception of a digital television broadcast.

DESCRIPTION OF EMBODIMENTS

Embodiments of the present invention will now be described with reference to the drawings.

Example 1

Figure 1:
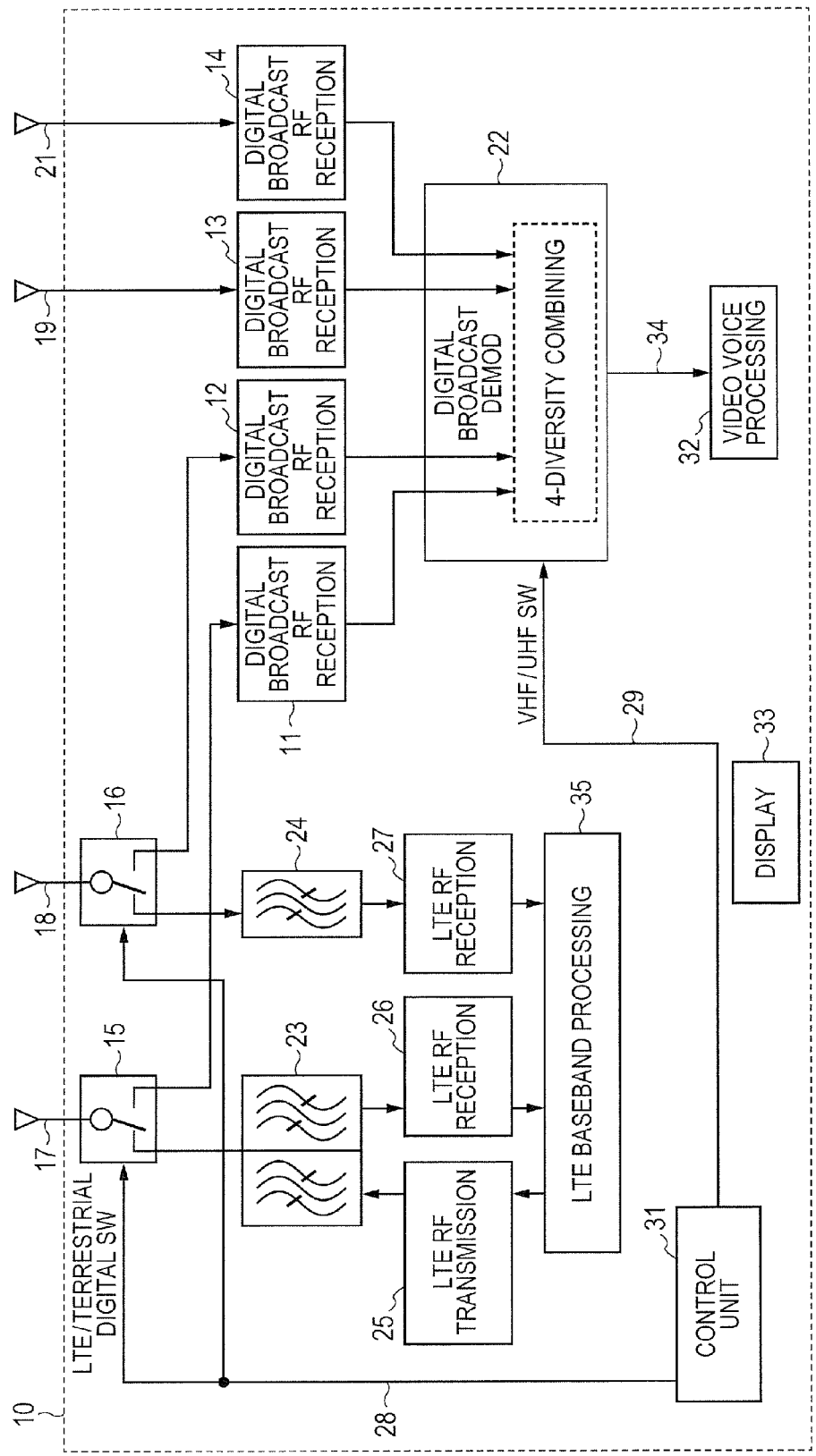
FIG. 1 is a block diagram illustrating a digital television broadcast receiver with an LTE communication function, according to Example 1.

FIG. 1 is a block diagram illustrating a digital television broadcast receiver with an LTE communication function, according to one example of the present invention.

In FIG. 1, "10" represents a digital television broadcast receiver (hereinafter, a digital broadcast receiver) with an LTE communication function. "11" to "14" represent digital broadcast RF reception units each of which receives a terrestrial digital television broadcast and outputs an IF signal. "15" and "16" represent high frequency switches. "17" and "18" represent broadcast antennas serving also as cellular phones, corresponding to the frequency of the LTE cellular phone and the frequency of the terrestrial digital television broadcast. "19" and "21" represent digital broadcast antennas corresponding to the frequency of the terrestrial digital television broadcast. "22" represents a digital broadcast demodulating unit which demodulates an IF signal of a terrestrial digital television broadcast into an MPEG-TS signal. "23" represents a duplexer for LTE. "24" represents a reception filter for LTE. "25" represents an RF transmission unit for LTE. "26" and "27" represent RF reception units for LTE. "35" represents a baseband signal processing unit for LTE. "28" represents an LTE/terrestrial digital broadcast switching signal. "29" represents a VHF/UHF switching signal. "31" represents a control unit. "32" represents a video voice processing unit for terrestrial digital broadcast. "33" represents a display unit. "34" represents an MPEG-TS signal.

In the digital broadcast receiver 10, when a user selects a television channel, the control unit 31 controls the digital broadcast RF reception units 11 to 14 to receive the selected television channel, and controls the digital broadcast demodulating unit 22 to demodulate it and to output the MPEG-TS signal 34.

The video voice processing unit 32 demodulates the MPEG-TS signal 34, and displays the video on the display unit 33. Hence, the user can view the television broadcast.

At this time, the high frequency switches 15 and 16 are connected to the side of the digital broadcast RF reception units 11 and 12. The television channel is in the range between 467 MHz and 767 MHz in the UHF band as a frequency band in which a terrestrial digital broadcast is received. The digital broadcast demodulating unit 22 performs reception diversity combining on four IF signals using a 4-reception diversity combining unit therein, to generate the MPEG-TS signal 34.

When the user finishes viewing the television broadcast, the control unit 31 connects the high frequency switch 15 to the duplexer 23 for LTE and the high frequency switch 16 to the reception filter 24 for LTE, using the LTE/terrestrial digital broadcast switching signal 28.

Further, the control unit 31 controls the LTE baseband signal processing unit 35 to operate for transmitting/receiving an LTE signal. The transmitted signal generated by the LTE baseband signal processing unit 35 is transmitted from the broadcast antenna 17, serving also as a cellular phone, through the RF transmission unit 25 for LTE, the duplexer 23 for LTE, and the high frequency switch 15.

The received signal received by the broadcast antenna 17, serving also as a cellular phone, is supplied to the LTE baseband signal processing unit 35, through the high frequency switch 15, the duplexer 23 for LTE, and the RF reception unit 26 for LTE. The received signal received by the broadcast antenna 18, serving also as a cellular phone, is supplied to the LTE baseband signal processing unit 35, through the high frequency switch 16, the reception filter 24 for LTE, and the RF reception unit for LTE 27.

Accordingly, the digital broadcast receiver 10 can perform 4-diversity reception for enabling to view the digital television broadcast, and can perform communication using an LTE technique based on 2-diversity reception.

Figure 2:
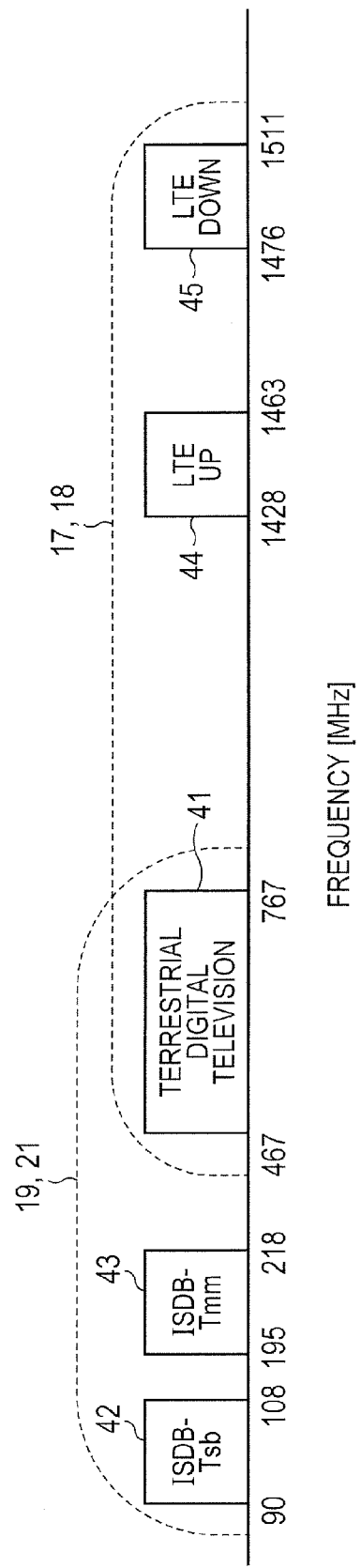
FIG. 2 is a diagram illustrating transmitting/receiving signals and frequency bands of antennas, according to Examples 1 to 3.

FIG. 2 illustrates frequency bands of a terrestrial digital television broadcast and an LTE system cellular phone.

"17" and "18" represent frequency bands covered by the broadcast antenna (serving also as a cellular phone). "19" and "21" represent frequency bands covered by the digital broadcast antenna. Within these frequencies, "41" represents a frequency band (467 MHz to 767 MHz) of a terrestrial digital television broadcast, "42" represents a frequency band (90 MHz to 108 MHz) of an ISDB-Tsb broadcast, "43" represents a frequency band (195 MHz to 218 MHz) of an ISDB-Tmm broadcast, "44" represents an uplink frequency band (1428 MHz to 1463 MHz) of LTE cellular phones, and "45" represents a downlink frequency band (1476 MHz to 1511 MHz) of LTE cellular phones.

The broadcast antennas, serving also as cellular phones, 17 and 18 are antennas that can transmit and receive both of the terrestrial digital television broadcast band 41 and the LTE bands 44 and 45. Thus, as described above, both of the television broadcast reception and LTE communication are possible, using the antennas 17, 18, 19, and 21.

When the user receives an ISDB-Tmm broadcast using a VHF band, the control unit 31 changes from the 4-reception diversity combining unit of the digital broadcast demodulating unit 22 to 2-reception diversity combining, using the VHF/UHF switching signal 29.

At the same time, the operations of the digital broadcast RF reception units 11 and 12 are stopped, thus lowering the power consumption.

By this operation, the ISDB-Tmm signals received by the digital broadcast antennas 19 and 21 are converted into IF signals by the digital broadcast RF reception units 13 and 14. 2-diversity combining is performed for the converted signals by the digital broadcast demodulating unit 22, and they are output to the video voice processing unit 32.

The ISDB-Tsb broadcast using the VHF band can similarly be received.

As a specific diversity combining method, there is used a maximum ratio combining method for weighting each of and combining a plurality of sub-carriers extracted in a process for demodulating, for example, each channel signal. There are other methods such as a selection combining method for selecting the maximum power channel signal and discarding the other channel signals, and an equal gain combining method for equalizing the phases of the channel signals and combining together.

According to the present invention, with using four antennas, it is possible to miniaturize the terrestrial digital television broadcast receiver with the LTE communication function that can perform both high image quality mobile reception in a television broadcast using 4-reception diversity and LTE communication.

Further, according to the present invention, it is possible to receive the ISDB-Tmm broadcast and ISDB-TSB broadcast with using the four antennas without additional antennas.

Example 2

Figure 3:
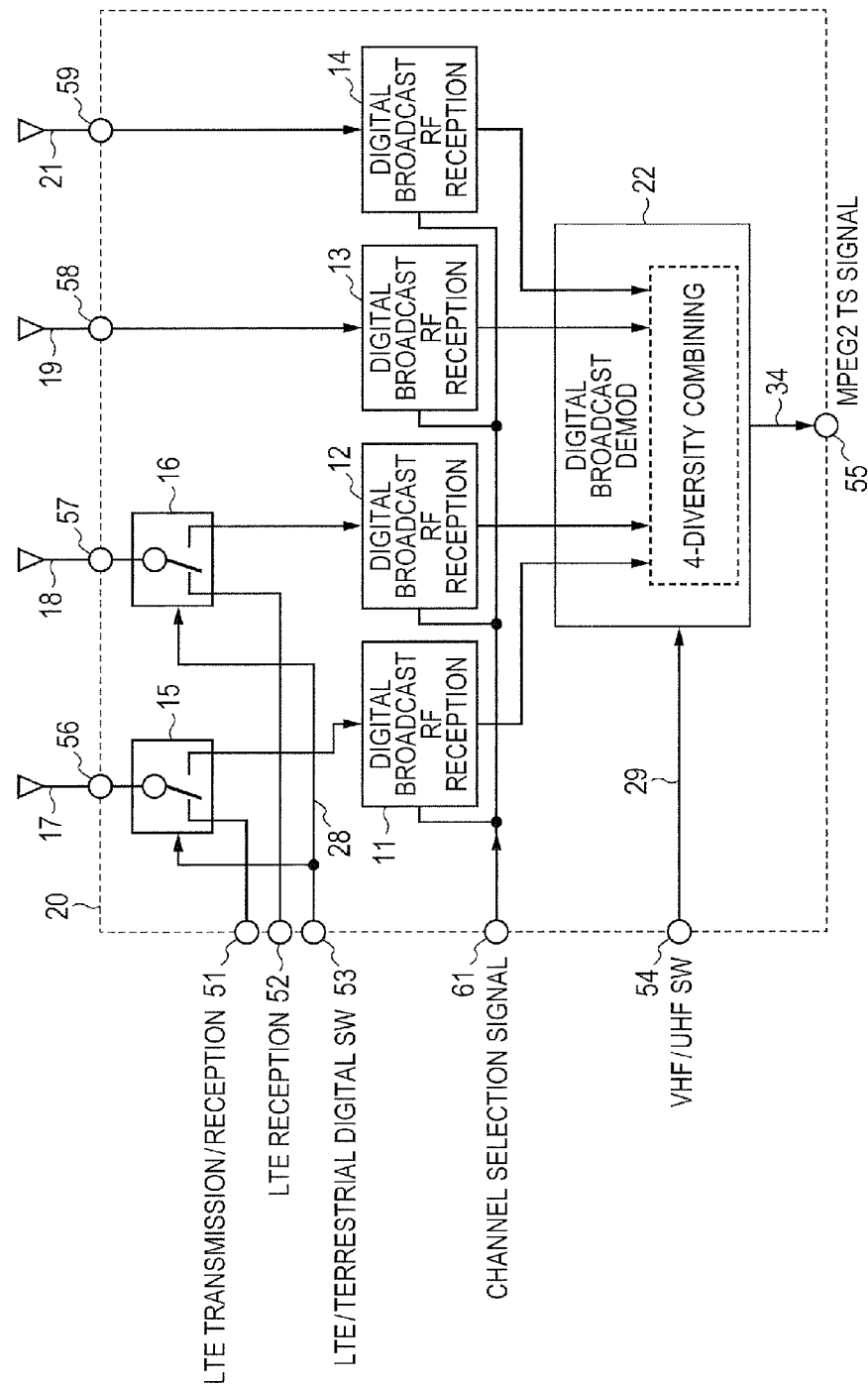
FIG. 3 is a block diagram illustrating a digital broadcast tuner according to Example 2.

FIG. 3 is a block diagram illustrating a terrestrial digital television broadcast tuner module, according to Example 2 of the present invention.

In FIG. 3, "20" represents a terrestrial digital television broadcast tuner module (hereinafter a tuner), "51" represents a transmitting/receiving terminal for LTE, "52" represents a reception terminal for LTE, "53" represents an LTE/terrestrial digital broadcast switching signal terminal, "54" represents a VHF/UHF switching signal terminal, "55" represents an MPEG2-TS signal terminal, "56" and "57" represent broadcast antenna terminals (serving also as cellular phones), "58" and "59" represent digital broadcast antenna terminals, "61" represents a channel selection signal terminal, and the other elements are the same as those of FIG. 1.

The tuner 20 is a module in which the circuit block and other parts of FIG. 3 are implemented, and is used in an implemented form on the printed wiring substrate of a digital television broadcast receiver (hereinafter, a digital broadcast receiver) with an LTE communication function.

The transmitting/receiving terminal 51 for LTE is connected to a duplexer for LTE of the digital broadcast receiver. The reception terminal 52 for LTE is connected to the reception filter for LTE of the digital broadcast receiver. The LTE/terrestrial digital switching signal terminal 53 and the VHF/UHF switching signal terminal 54 are connected to the control unit of the digital broadcast receiver. The MEG2-TS signal terminal 55 is connected to a video voice signal processing unit of the digital broadcast receiver.

The broadcast antenna terminals (serving also as cellular phones) 56 and 57 are connected to the antennas 17 and 18 having the frequency characteristics illustrated in FIG. 2, while the digital broadcast antenna terminals 58 and 59 are connected to the antennas 19 and 21 having the frequency characteristics illustrated in FIG. 2.

In the tuner 20, when the user selects a television channel, the control unit outputs channel data to a selection signal terminal 61, controls the digital broadcast RF reception units 11 to 14 to receive an RF signal, controls the digital broadcast demodulating unit 22 to demodulate it, and controls to output an MPEG2-TS signal from the MPEG2-TS signal terminal 55.

The video voice processing unit decodes the MPEG2-TS signal, and displays video on the display unit, thereby allowing the user to view a television broadcast.

At this time, the high frequency switches 15 and 16 are connected to the side of the digital broadcast RF reception units 11 and 12. The television channel is in the range between 467 MHz and 767 MHz of the UHF band. The digital broadcast demodulating unit 22 performs reception diversity combining on four IF signals using the 4-reception diversity combining unit therein, to generate an MPEG2-TS signal 34.

When the user finishes viewing the television channel, the tuner 20 connects the high frequency switch 15 to the duplexer 23 for LTE and the high frequency switch 16 to the reception filter 24 for LTE, in accordance with a control signal from the control unit to the LTE/terrestrial digital broadcast switching signal terminal 53. This enables the transmitting/receiving of the LTE high frequency signal.

The LTE high frequency signal is processed in the LTE high frequency unit of the digital broadcast receiver and the LTE baseband signal processing unit, for the LTE communication operation.

In this manner, the tuner 20 performs 4-diversity reception for viewing the digital television broadcast, and enables communication using the LTE technique based on 2-diversity reception.

When the user receives the ISDB-Tmm broadcast using the VHF band, the tuner 20 switches from the 4-reception diversity combining unit of the digital broadcast demodulating unit 22 to the 2-reception diversity combining, using a signal of the VHF/UHF switching signal terminal 54.

At the same time, the tuner 20 stops operations of the digital broadcast RF reception units 11 and 12, thus lowering the consumption power.

By this operation, the ISDB-Tmm signals received by the digital broadcast antennas 19 and 21 are converted into IF signals by the digital broadcast RF reception units 13 and 14. The signals are processed in 2-diversity combining by the digital broadcast demodulating unit 22, and output from the MPEG2-TS terminal 55.

The ISDB-Tsb broadcast using the VHF band can similarly be received.

In Example 2, it is possible to miniaturize the terrestrial digital television broadcast tuner module that can perform both high image quality mobile reception in a television broadcast using 4-reception diversity and LTE communication, using four antennas.

According to Example 2, the ISDB-Tmm broadcast and the ISDB-Tsb broadcast can also be received using four antennas without additional antennas.

Example 3

Figure 4:
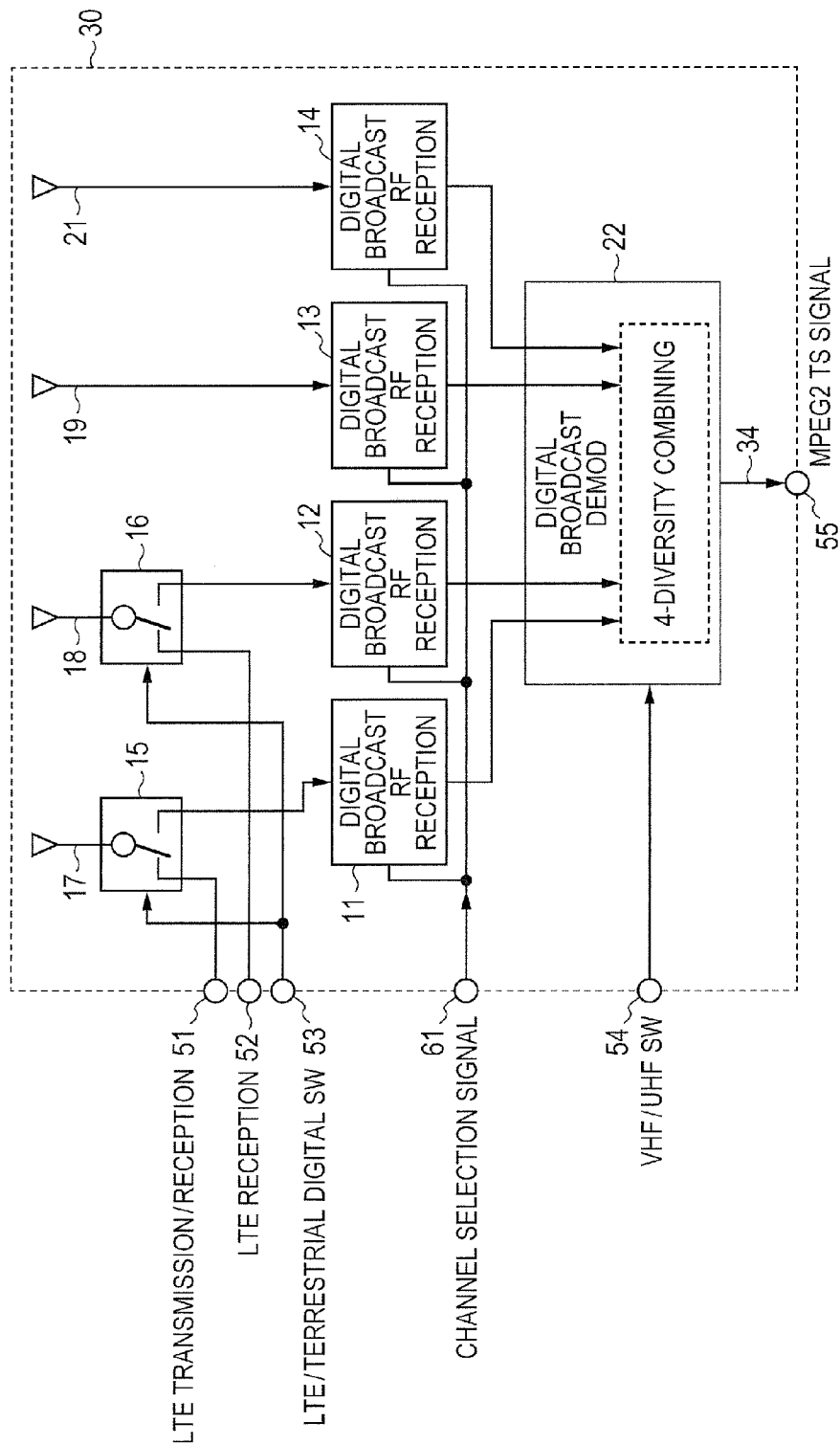
FIG. 4 is a block diagram illustrating a digital broadcast tuner with built-in antennas, according to Example 3.

FIG. 4 is a block diagram illustrating a digital television broadcast tuner module with built-in antennas, according to Example 3.

In FIG. 4, "30" represents a terrestrial digital television broadcast tuner module with built-in antennas (hereinafter, a tuner with built-in antennas), and the other elements are the same as those in FIG. 1 and FIG. 3.

The tuner with built-in antennas 30 is a built-in module on which the antennas, the circuit block, and the elements are implemented on a printed wiring substrate, and is implemented on the substrate of the digital television broadcast receiver (hereinafter, a digital broadcast receiver) with an LTE communication function.

The antennas 17, 18, 19, and 21 are realized in the form of dielectric antennas in which patterned conductors are attached to a rectangular dielectric member or wiring antennas (pattern antennas) with a form set in accordance with the reception band or directivity on the printed wiring substrate.

The specific example of the conductor pattern of the conductor antenna includes an inverted-F antenna shaped like a letter F turned 90 degrees.

The transmitting/receiving terminal 51 for LTE is connected to the duplexer for LTE of the digital broadcast receiver. The reception terminal 52 for LTE is connected to the reception filter for LTE of the digital broadcast receiver. The LTE/terrestrial digital switching signal terminal 53 and the VHF/UHF switching signal terminal 54 are connected to the control unit of the digital broadcast receiver. The MPEG2-TS signal terminal 55 is connected to the video voice signal processing unit of the digital broadcast receiver.

In the tuner with built-in antennas 30, when the user selects a television channel, the control unit outputs channel data to the selection signal terminal 61, the high frequency signals received by the antennas 17, 18, 19, and 21 are converted into IF signals by the digital broadcast RF reception units 11 to 14, and then the signals are output.

After this, the operations are performed like those of Example 2, and the user can view a television broadcast.

When the user finished viewing the television broadcast, the tuner with built-in antennas 30 connects the high frequency switch 15 to the duplexer 23 for LTE, and connects the high frequency switch 16 to the reception filter 24 for LTE, in accordance with a control signal from the control unit to the LTE/terrestrial digital broadcast switching signal terminal 53.

After this, the operations are performed like those of Example 2, and the LTE communication operation can be performed.

When the user receives an ISDB-Tmm broadcast using the VHF band, the tuner with built-in antennas 30 changes from the reception diversity combining unit of the digital broadcast demodulating unit 22 to 2-reception diversity combining, in accordance with a signal of the VHF/UHF switching signal terminal 54.

After this, the operations are performed like those of Example 2, and the ISDB-Tmm broadcast can be viewed.

The operations are similarly performed for viewing the ISDB-Tsb broadcast using the VHF band.

Accordingly, in Example 3, it is possible to miniaturize the digital television broadcast tuner module with built-in antennas that can perform both high image quality mobile reception in a television broadcast using 4-reception diversity and LTE communication, with four built-in antennas.

Further, according to Example 3, the ISDB-Tmm broadcast and the ISDB-Tsb broadcast can be received using four antennas without additional antennas.

Example 4

Figure 5:
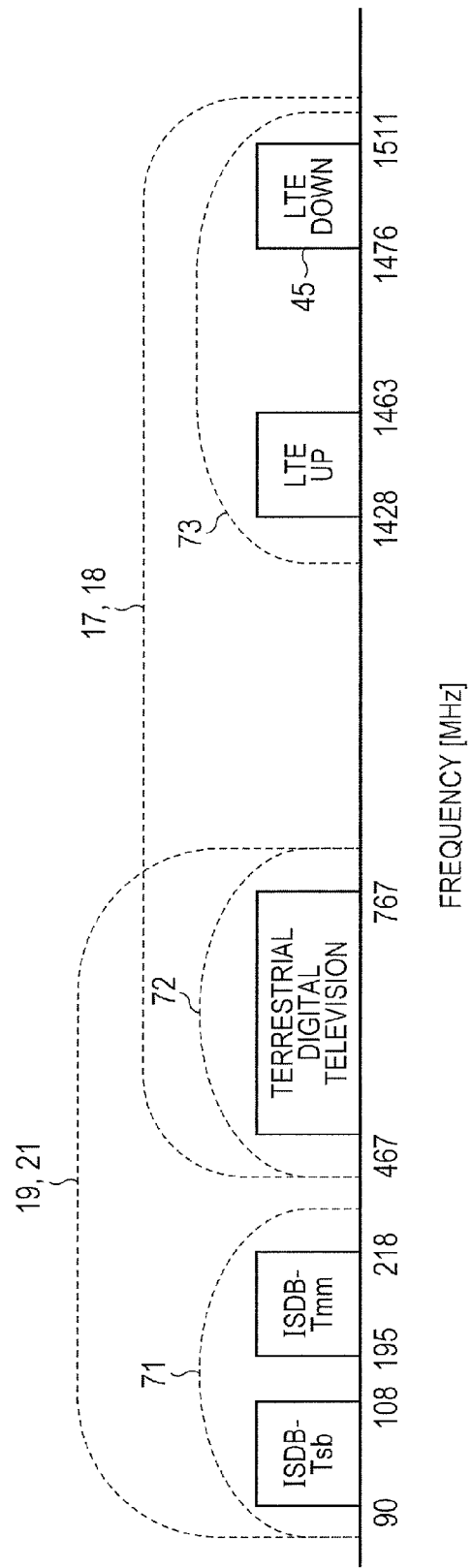
FIG. 5 is a diagram illustrating a transmitting/receiving signals and frequency bands of antennas, according to Example 4.

FIG. 5 illustrates the transmitting/receiving signal and frequency bands of antennas, in Example 4 of the present invention.

In FIG. 5, "71" represents frequency bands of a VHF-L band antenna element, "72" represents a frequency band of a terrestrial digital television antenna element, "73" represents frequency bands of an antenna element in the band of an LTE cellular phone, and the other elements are the same as those of FIG. 2.

It may be difficult to realize the broadcast antennas (serving also as cellular phones) 17 and 18, because the frequency band is very wide and the relative band is quite large. Thus, Example 4 has an antenna including the terrestrial digital television antenna element 72 (having a gain over the terrestrial digital television frequency band) and the LTE cellular phone band antenna element 73 (having a gain over the LTE cellular phone band), which are incorporated together.

Similarly, the broadcast reception antennas 19 and 21 are composed of two elements that are the VHF-L band antenna element 71 having a gain over the VHF-L band and the terrestrial digital television antenna element 72.

By this configuration, it is possible to configure the digital broadcast reception tuner module having a necessary antenna gain and having an LTE communication function with built-in antennas.

Other than the above-described method for realizing the antennas having a wide frequency band and a large relative band, there is a method in which a varactor diode is added to one antenna element and the voltage to be applied to the varactor diode is changed, thereby switching the center band of the antenna.

Example 5

Figure 6:
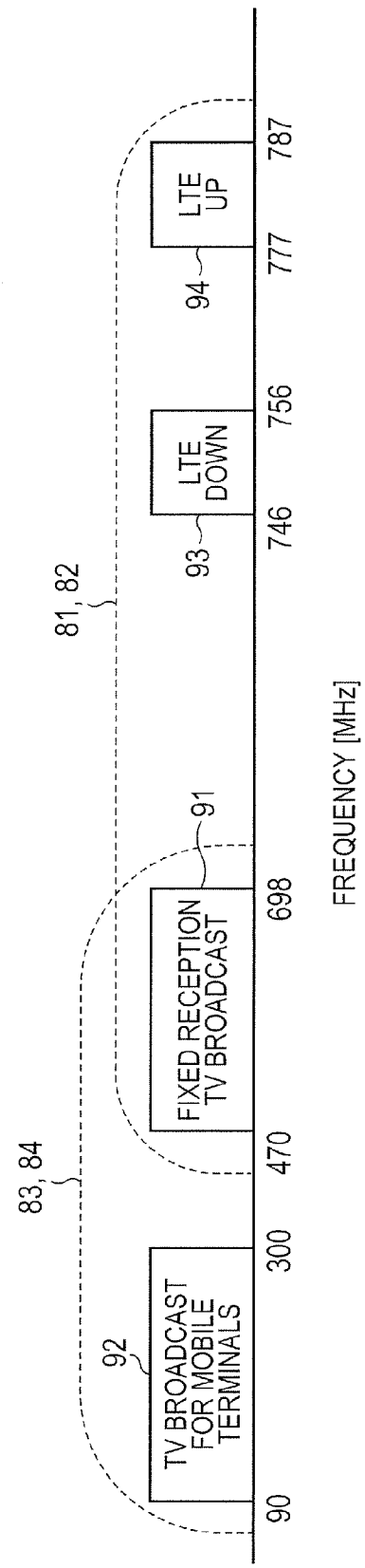
FIG. 6 is a diagram illustrating transmitting/receiving signals and frequency bands of antennas, according to Example 5.

FIG. 6 illustrates transmitting/receiving signals and frequency bands of antennas, in Example 5 of the present invention.

FIG. 6 illustrates frequency bands of a terrestrial digital television broadcast and an LTE cellular phone. "81" and "82" represent frequency bands of broadcast antennas (serving also as cellular phones), "83" and "84" represent frequency bands of digital broadcast antennas, "91" represents a frequency band (470 MHz to 698 MHz) of an ATSC terrestrial digital television broadcast provided in North America, "92" represents a frequency band (90 MHz to 300 MHz) of a television broadcast for mobile objects, "93" represents a downlink frequency band (746 MHz to 756 MHz) of LTE cellular phones, and "94" represents an uplink frequency band (777 MHz to 787 MHz) of LTE cellular phones.

The broadcast antennas 81 and 82 (serving also as cellular phones) are antennas that can transmit/receive data in both the frequency band 91 of the terrestrial digital television broadcast and the frequency bands 93 and 94 of the LTE cellular phones. Thus, it is possible to receive television broadcasts and communicate with LTE cellular phones, using the above antennas 81, 82, 83, and 84.

Example 6

Figure 7:
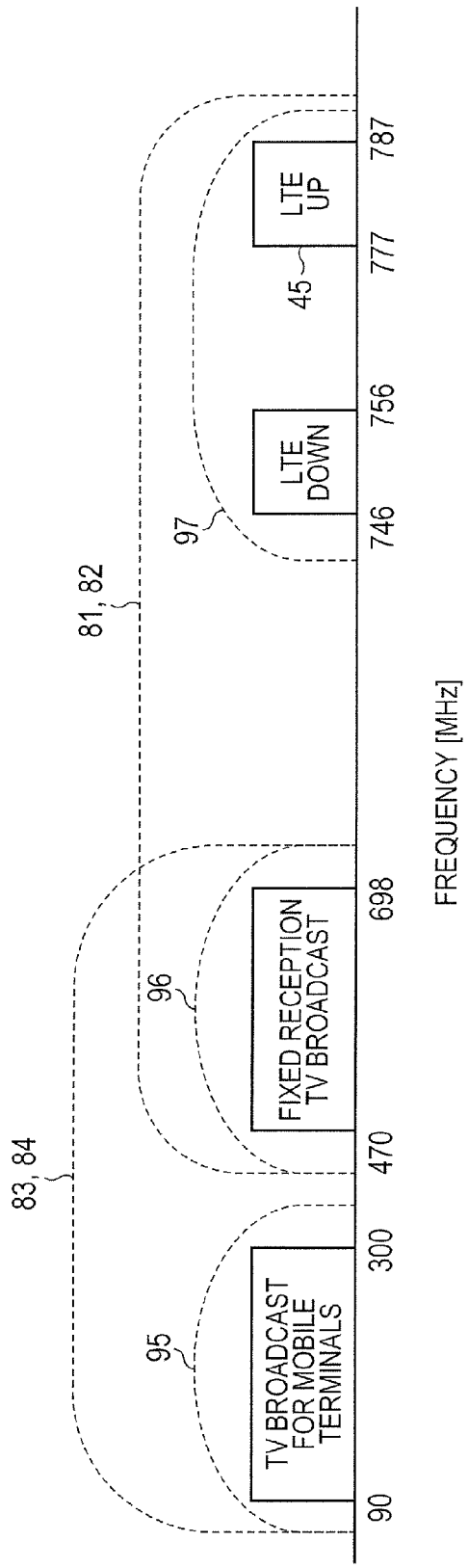
FIG. 7 is a diagram illustrating transmitting/receiving signals and frequency bands of antennas, according to Example 6.

FIG. 7 illustrates transmitting/receiving signals and frequency bands of antennas, in Example 6 of the present invention.

In FIG. 7, "95" represents a frequency band of a VHF-L band antenna element, "96" represents a frequency band of an antenna element for ATSC terrestrial digital television provided in North America, "97" is a frequency band of an antenna element for LTE cellular phones, and the other elements are the same as those of FIG. 6.

It may be difficult to realize the broadcast antennas 81 and 82 (serving also as cellular phones), because the frequency band is very wide and the relative band is quite large. Example 6 has an antenna which is composed of two elements including an antenna element 96 for terrestrial digital television (having a gain over a frequency band of a terrestrial digital television broadcast) and an antenna element 97 for LTE cellular phones (having a gain over a frequency band of LTE cellular phones), which are incorporated together.

Similarly, the broadcast reception antennas 83 and 84 are composed of two antenna elements that are a VHF-L band antenna element 95 having a gain over the VHF-L band and the antenna element 96 for the terrestrial digital television.

By this configuration, it is possible to configure a digital broadcast reception tuner module having necessary antenna gains and an LTE communication function with built-in antennas.

In Examples 5 and 6, the illustrated bands of the LTE cellular phones in North America are the downlink 746 MHz to 756 MHz and the uplink 777 MHz to 787 MHz. However, the present invention is not limited to this, and includes other cases of other frequency bands.

In North America, in particular, other frequency bands for use in the LTE cellular phones are considered to be the uplink 1710 MHz to 1755 MHz and the downlink 2110 MHz to 2155 MHz (BandIV in 3GPP).

In this case, the antennas 81 and 82 of FIG. 6 cover from 470 MHz to 2155 MHz, while the antenna element 97 for LTE cellular phones of FIG. 7 covers from 1710 MHz to 2155 MHz.

Other than the method for realizing the antenna having a very wide frequency band and a large relative band, there is a method in which a varactor diode is added to one antenna element, and the voltage to be applied to the varactor diode is changed, thereby switching the center band of the antenna.

The above-described embodiments of the present invention are not to limit the present invention. For example, 4-reception diversity is used for reception of the terrestrial digital broadcast, while 2-reception diversity is used for other types of reception. However, this is not an essential condition. It is possible to apply it in an embodiment in which the number of prepared antennas is smaller than the sum number of channels of both cases. In another example to be considered, addition or deletion of constituent elements may be made in the block diagrams of FIG. 1, FIG. 3, and FIG. 4. In another example to be considered, a change(s) may be made in a method for controlling the constituent elements. Any of these cases is within the scope of the present invention.

REFERENCE SIGNS LIST

10 . . . Digital television broadcast receiver with LTE communication function, 11 to 14 . . . Digital broadcast RF reception unit, 15, 16 . . . High frequency switch, 17, 18 . . . Broadcast antenna serving also as cellular phone, 19, 21 . . . Digital broadcast antenna, 22 . . . Digital broadcast demodulating unit, 23 . . . Duplexer for LTE, 24 . . . Reception filter for LTE, 25 . . . RF transmission unit for LTE, 26, 27 . . . RF reception unit for LTE, 35 . . . Baseband signal processing unit for LTE, 28 . . . LTE/terrestrial digital broadcast switching signal, 29 . . . VHF/UHF switching signal, 31 . . . Control unit, 32 . . . Video voice processing unit for terrestrial digital broadcast, 33 . . . Display unit, 34 . . . MPEG-TS signal.

The invention claimed is:

1. A tuner module which transmits/receives a signal for mobile communication through a transmitting/receiving antenna, and receives a signal of a digital television broadcast through a reception antenna or the reception antenna and the transmitting/receiving antenna, the module comprising:

a first high frequency switch which has a first contact point to which a transmitting/receiving RF signal for the mobile communication is supplied, a second contact point to which a reception RF signal of the digital television broadcast is supplied, and a common contact point to which one of the first contact point and the second contact point is selectively connected and which is connected to a first transmitting/receiving antenna;

a second high frequency switch which has a first contact point to which a transmitting/receiving RF signal for the mobile communication is supplied, a second contact point to which a reception RF signal of the digital television broadcast is supplied, and a common contact point to which one of the first contact point and the second contact point is selectively connected and which is connected to a second transmitting/receiving antenna;

a first digital broadcast RF reception unit which receives a reception RF signal of the digital television broadcast supplied from the second contact point in the first high frequency switch, and converts the reception RF signal into a reception IF signal;

a second digital broadcast RF reception unit which receives a reception RF signal of the digital television broadcast supplied from the second contact point in the second high frequency switch, and converts the reception RF signal into a reception IF signal;

a third digital broadcast RF reception unit which receives a reception RF signal of the digital television broadcast supplied from a first reception antenna, and converts the reception RF signal into a reception IF signal;

a fourth digital broadcast RF reception unit which receives a reception RF signal of the digital television broadcast supplied from a second reception antenna, and converts the reception RF signal into a reception IF signal; and a digital broadcast demodulating unit which receives the reception IF signals obtained by conversion by any of the first to fourth digital broadcast RF reception units, performs diversity combining on the signals, demodulates and externally outputs the signals.

2. The tuner module according to claim 1, further comprising:

a first transmitting/receiving antenna which is connected to the common contact point of the first high frequency switch, transmits and receives a signal for the mobile communication, and receives a signal of the digital television broadcast;

a second transmitting/receiving antenna which is connected to the common contact point of the second high frequency switch, transmits and receives a signal for the mobile communication, and receives a signal of the digital television broadcast;

a first reception antenna which is connected to the third digital television broadcast RF reception unit, and receives a signal of the digital television broadcast; and a second reception antenna which is connected to the fourth digital television broadcast RF reception unit, and receives a signal of the digital television broadcast.

3. The tuner module according to claim 2, wherein a band of the first and second transmitting/receiving antennas is from 460 MHz to 1520 MHz, and a band of the first and second reception antennas is from 90 MHz to 770 MHz.

4. The tuner module according to claim 2, wherein the first and second transmitting/receiving antennas include an antenna element which coverts from 460 MHz to 770 MHz and an antenna element which covers from 1428 MHz to 1511 MHz, and the first and second reception antennas include an antenna element which covers from 90 MHz to 218 MHz and an antenna element which covers from 460 MHz to 770 MHz.

5. The tuner module according to claim 2, wherein a band of the first and second transmitting/receiving antennas is from 470 MHz to 787 MHz, and a band of the first and second reception antennas is from 90 MHz to 698 MHz.

6. The tuner module according to claim 2, wherein the first and second transmitting/receiving antennas include an antenna element which covers from 470 MHz to 698 MHz and an antenna element which covers from 746 MHz to 787 MHz, and the first and second reception antennas include an antenna element which covers from 90 MHz to 300 MHz and an antenna element which covers from 470 MHz to 698 MHz.

7. The tuner module according to claim 1, wherein the digital broadcast demodulating unit:

stops an operation of the first and second digital broadcast RF reception units, and performs 2-system diversity combining using the reception IF signals obtained by conversion by the third and fourth digital broadcast RF reception units when the tuner module receives a digital television broadcast of a VHF band; and performs 4-system diversity combining using the reception IF signals obtained by conversion by any of the first to fourth digital broadcast RF reception units when the mobile communication terminal receives a digital television broadcast of a UHF band.

8. The tuner module according to claim 1, wherein the mobile communication is an LTE system, and the television broadcast is a terrestrial digital television broadcast (an ISDB-T system, a DVB-T system, a DTMB system, or an ATSC system).

9. The tuner module according to claim 7, wherein the digital television broadcast of the UHF band is a terrestrial digital television broadcast (an ISDB-T system, a DVB-T system, a DTMB system, or an ATSC system), and the digital television broadcast of the VHF band is an ISDB-Tmm broadcast or/and an ISDB-Tsb broadcast.

10. The tuner module according to claim 1, comprising:

an M-number of digital broadcast RF reception units each of which receives a reception RF signal of the digital television broadcast from the first reception antenna, and converts the reception RF signal into a reception IF signal;

an N-number (N<M) of first high frequency switches each of which has a first contact point to which a transmitting/receiving RF signal for the mobile communication is supplied, a second contact point to which a reception RF signal of the digital television broadcast is supplied, and a common contact point to which one of the first contact point and the second contact pint is selectively connected and which is connected to a first transmitting/receiving antenna;

an N-number of digital broadcast RF reception units each of which receives a reception RF signal of the digital television broadcast from the second contact point in the N-number of high frequency switches, and converts the reception RF signal into a reception IF signal; and a digital broadcast demodulating unit which receives the reception IF signals obtained by conversion by any of the first to M-th digital broadcast RF reception units, performs diversity combining on the signal, and demodulating and externally outputting the signal.

11. The tuner module according to claim 1, comprising:

an L-number of first high frequency switches each of which includes a first contact point to which a transmitting/receiving RF signal for the mobile communication is supplied and a second contact point to which a reception RF signal of the digital television broadcast is supplied, and a common contact point to which one of the first contact point and the second contact point is selectively connected and which is connected to a first transmitting/receiving antenna;

a K-number (K<L) of digital broadcast RF receivers each of which receives a reception RF signal of the digital television broadcast from the first reception antenna, and converts the reception RF signal into a reception IF signal;

a K-number of digital broadcast RF reception units each of which receives a reception RF signal of the digital television broadcast from the second contact point in the K-number of high frequency switches, and converts the reception RF signal into a reception IF signal; and a digital broadcast demodulating unit which receives the reception IF signals obtained by conversion by the first to K-th digital broadcast RF reception units, performs diversity combining on the signal, and demodulating and externally outputting the signal.

12. A mobile communication terminal which transmits/receives a signal for mobile communication through a transmitting/receiving antenna, and receives a signal of a digital television broadcast through a reception antenna or the reception antenna and a transmitting/receiving antenna, the terminal comprising:

a first transmitting/receiving antenna which transmits/receives a signal for the mobile communication, and receives a signal of the digital television broadcast;

a second transmitting/receiving antenna which transmits/receives a signal for the mobile communication, and receives a signal of the digital television broadcast;

a first reception antenna which receives a signal of the digital television broadcast;

a second reception antenna which receives a signal of the digital television broadcast;

a first high frequency switch which has a first contact point to which a transmitting/receiving RF signal for the mobile communication is supplied, a second contact point to which a reception RF signal of the digital television broadcast is supplied, and a common contact point to which one of the first contact point and the second contact point is selectively connected and which is connected to the first transmitting/receiving antenna;

a second high frequency switch which has a first contact point to which a transmitting/receiving RF signal for the mobile communication is supplied, a second contact point to which a reception RF signal of the digital television broadcast is supplied, and a common contact point to which one of the first contact point and the second contact point is selectively connected and which is connected to the second transmitting/receiving antenna;

a mobile communication transmitting/receiving unit which generates the transmission RF signal for the mobile communication and supplies it to the first contact point in the first high frequency switch, processes a reception RF signal for the mobile communication supplied from the first contact point in the first high frequency switch, processes the reception RF signal for the mobile communication supplied from the first contact point in the second high frequency switch, and performs diversity combining on and demodulating the signal;

a first digital broadcast RF reception unit which receives a reception RF signal of the digital television broadcast supplied from the second contact point in the first high frequency switch, and converts the reception RF signal into a reception IF signal;

a second digital broadcast RF reception unit which receives a reception RF signal of the digital television broadcast supplied from the second contact point in the second high frequency switch, and converts the reception RF signal into a reception IF signal;

a third digital broadcast RF reception unit which receives a reception RF signal of the digital television broadcast from the first reception antenna, and converts the reception RF signal into a reception IF signal;

a fourth digital broadcast RF reception unit which receives a reception RF signal of the digital television broadcast from the second reception antenna, and converts the reception RF signal into a reception IF signal;

a digital broadcast demodulating unit which receives the reception IF signals obtained by conversion by any of the first to fourth digital broadcast RF reception units, and performs diversity combining on and demodulating the signals; and a control unit which controls an operation of the mobile communication terminal, the control unit controlling the first high frequency switch and the second high frequency switch to connect the common contact point in each of the first high frequency switch and the second high frequency switch to the first contact point when mobile communication is to be performed, and to connect the common contact point to the second contact point when the digital television broadcast is to be received.

13. The mobile communication terminal according to claim 12,
wherein a band of the first and second transmitting/receiving antennas is from 460 MHz to 152 MHz, and a band of the first and second reception antennas is from 90 MHz to 770 MHz.

14. The mobile communication terminal according to claim 12,
wherein the first and second transmitting/receiving antennas include an antenna element which covers from 460 MHz to 770 MHz and an antenna element which coves from 1428 MHz to 1511 MHz, and the first and second reception antennas include an antenna element which covers from 90 MHz to 218 MHz and an antenna element which covers from 460 MHz and 770 MHz.

15. The mobile communication terminal according to claim 12,
wherein a band of the first and second transmitting/receiving antennas is from 470 MHz to 787 MHz, and a band of the first and second reception antennas is from 90 MHz to 698 MHz.

16. The mobile communication terminal according to claim 12,
wherein the first and second transmitting/receiving antennas include an antenna element which covers from 470 MHz to 698 MHz and an antenna element which covers from 746 MHz to 787 MHz, and the first and second reception antennas include an antenna element which covers from 90 MHz to 300 MHz and an antenna element which covers from 470 MHz to 698 MHz.

17. The mobile communication terminal according to claim 12, wherein the control unit controls the digital broadcast demodulating unit to:

stop an operation of the first and second digital broadcast RF reception units, and perform 2-system diversity combining using the reception IF signals obtained by conversion by the third and fourth digital broadcast RF reception units, when the mobile communication terminal receives a digital television broadcast of a VHF band, and perform 4-system diversity combining using the reception IF signals obtained by conversion by any of the first to fourth digital broadcast RF reception units when the mobile communication unit receives a digital television broadcast of a UHF band.

18. The mobile communication terminal according to claim 12, wherein the mobile communication is an LTE system, and the television broadcast is a terrestrial digital television broadcast (an ISDB-T system, a DVB-T system DTMB system, or an ATSC system).

19. The mobile communication terminal according to claim 17, wherein the digital television broadcast of the UHF band is a terrestrial digital television broadcast (an ISDB-T system, a DVB-T system, a DTMB system, or an ATSC system), and the digital television broadcast of the VHF band is an ISDB-Tmm broadcast or/and an ISDB-Tsb broadcast.

20. The mobile communication terminal according to claim 12, comprising:
an M-number of digital broadcast RF reception units each of which receives a reception RF signal of the digital television broadcast from the first reception antenna, and converts the reception RF signal into a reception IF signal;
an N-number (N<M) of first high frequency switches each of which has a first contact point to which a transmitting/receiving RF signal for the mobile communication is supplied, a second contact point to which a reception RF signal of the digital television broadcast is supplied, and a common contact point to which one of the first contact point and the second contact point is selectively connected and which is connected to a first transmitting/receiving antenna;
an N-number of digital broadcast RF reception units each of which receives the reception RF signal of the digital television broadcast from the second contact point in the N-number of high frequency switches, and converts the reception RF signal into a reception IF signal; and
a digital broadcast demodulating unit which receives the reception IF signals obtained by conversion by any of the first to M-th digital broadcast RF reception units, performs diversity combining on the signals, and demodulating and externally outputting the signals.

21. The mobile communication terminal according to claim 12, comprising:
an L-number of first high frequency switches each of which includes a first contact point to which a transmitting/receiving RF signal for the mobile communication is supplied, a second contact point to which a reception RF signal of the digital television broadcast is supplied, and a common contact point to which one of the first contact point and the second contact point is selectively connected and which is connected to a first transmitting/receiving antenna;
a K-number (K<L) of digital broadcast RF reception units each of which receives a reception RF signal of the digital television broadcast from the first reception antenna, and converts the reception RF signal into the reception IF signal;
a K-number of digital broadcast RF reception units each of which receives a reception RF signal of the digital television broadcast from the second contact point in the K-number of high frequency switches, and converts the reception RF signal into the reception IF signal; and
a digital broadcast demodulating unit which receives the reception IF signal obtained by conversion by the first to K-th digital broadcast RF reception units, performs diversity combining on the IF signals, and demodulating and externally outputting the signal.

* * * * *